US008615155B2

(12) United States Patent
Jumpertz et al.

(10) Patent No.: US 8,615,155 B2
(45) Date of Patent: Dec. 24, 2013

(54) DEVICE AND METHOD FOR RECEIVING VIDEO DATA PACKETS

(75) Inventors: Jean-Luc Jumpertz, Rennes (FR); Bruno Cheron, Noyal sur Vilaine (FR); Bruno Le Garjan, Rennes (FR); Yannick Le Roux, Betton (FR)

(73) Assignee: Thomson Licensing, Issy les Moulineaux (FR)

( * ) Notice: Subject to any disclaimer, the term of this patent is extended or adjusted under 35 U.S.C. 154(b) by 234 days.

(21) Appl. No.: 12/735,157

(22) PCT Filed: Dec. 16, 2008

(86) PCT No.: PCT/EP2008/067676
§ 371 (c)(1),
(2), (4) Date: Sep. 23, 2011

(87) PCT Pub. No.: WO2009/077544
PCT Pub. Date: Jun. 25, 2009

(65) Prior Publication Data
US 2012/0106916 A1 May 3, 2012

(30) Foreign Application Priority Data
Dec. 19, 2007 (FR) ...................................... 07 60034

(51) Int. Cl.
*H04N 5/935* (2006.01)
(52) U.S. Cl.
USPC .......................................................... 386/214

(58) Field of Classification Search
None
See application file for complete search history.

(56) References Cited

U.S. PATENT DOCUMENTS

2005/0111838 A1* 5/2005 Arishima ....................... 386/125
2006/0147182 A1 7/2006 Yoo
2007/0230903 A1 10/2007 Sakatani et al.

* cited by examiner

*Primary Examiner* — William C Vaughn, Jr.
*Assistant Examiner* — Daniel Tekle
(74) *Attorney, Agent, or Firm* — Tutunjian & Bitetto, P.C.

(57) ABSTRACT

The invention relates to a device for receiving audio video data packets and corresponding method. According to said method, said packets received comprising an absolute time stamp showing the display time of said packets, said packets being intended to be displayed after their recording, or to be displayed directly following their reception. The device comprises an interface module with the display intended to respect, among other things, the display time of said packets. The device comprises:
means for reformatting said packets intended to be displayed after recording in such a manner that these packets after they have been read are received by the interface module with the display in the same format as said packets intended to be displayed directly following their reception,
said means for reformatting said packets modifying at least the time stamp of the packets intended for the recording.

10 Claims, 2 Drawing Sheets

IP front-end

DEVICE AND METHOD FOR RECEIVING VIDEO DATA PACKETS

This application claims the benefit, under 35 U.S.C. §365 of International Application PCT/EP2008/067676, filed Dec. 16, 2008, which was published in accordance with PCT Article 21(2) on Jun. 25, 2009 under international publication number WO2009/077544 in English and which claims the benefit of French patent application No. 07/60034, filed Dec. 19, 2007.

FIELD OF THE INVENTION

The invention relates to a device and method for receiving audio video data packets.

The invention relates more particularly to the stamping of data packets broadcast and received in a device of the personal recorder type (PVR), the data being recorded before being played.

BACKGROUND OF THE INVENTION

The temporal information associated with the video data packets sent by a broadcaster, for example television programmes, usually comprises absolute time stamps relative to their time of display and enabling them to be replayed as soon as they are received in a personal recorder type device or on a television set directly.

However, when the packets are recorded in the PVR before being read, it is necessary to be able to recover the time stamps in such a manner as to be able to decode and display the data subsequently decoded. For this purpose, the solutions existing today record the service information associated with the data flow in files associated with the audio video data.

The data recorded before being used is no longer in the same format as the data that is used directly during their reception. Indeed, to be able to use them, it is also necessary to recover the associated and recorded service information. This notably causes problems of complexity for the PVRs, forcing them to provide two different data paths for the recorded data and for the broadcast data. Likewise, the interface with the display device, typically a television set, is different to manage the two data paths, as the data is not present in the same form.

SUMMARY OF THE INVENTION

The invention proposes to solve at least one of these disadvantages.

For this purpose, the invention proposes a device for receiving audio video data packets, each of the packets received comprising an absolute time stamp representing the display time of the packets, the packets being intended to be displayed after their recording, or to be displayed directly following their reception, the device comprising an interface module with the display intended to respect, among other things, the packet display time. According to the invention, the device comprises means for reformatting the packets intended to be displayed after recording in such a manner that these packets after they have been read are received by the interface module with the display in the same format as the packets intended to be displayed directly following their reception, the means for reformatting the packets modifying at least the time stamp of the packets intended for the recording.

Preferentially, the means for reformatting said packets intended for the recording replaces the time stamp of the packets received by a new recording time stamp prior to their recording and while they are read with a view to display, replacing the recording time stamp with a time stamp representing the display time of said packets.

Advantageously, the interface module with the display is responsible for transmitting commands to the display device and for receiving instructions from a user, the interface module being suitable to modify the event tables of the audio video packets intended for viewing or previously recorded.

Preferentially, when the user wants to display the stream according to a special mode, said interface means modify a field relating to the duration in said event tables according to said special mode.

According to a preferred embodiment, the video data packets comprise service information in accordance with the DVB standard.

According to a preferred embodiment, the means for reformatting said packets intended to be displayed after recording comprises:

first demultiplexing submeans of the received packets to select the packets intended for the recording, recording submeans of said packets selected and of time stamps on a storage means, reading submeans of said packets and said time stamps, first modification submeans of said time stamps, second demultiplexing submeans of said packets in such a manner as to separate said packets and the time stamps, decoding submeans of said audio and video packets.

Preferentially, the device comprises between the first demultiplexing submeans and the recording submeans, second modification submeans of the time stamps.

Advantageously, the device comprises connection means to a local network intended to transmit packets to remote viewing devices.

According to a preferred embodiment, said service information is inserted periodically into the data packets during their reading after their recording.

The invention also relates to method for receiving video data packets, each of said packets received comprising an absolute time stamp representing the display time of said packets, said packets being intended to be displayed after their recording, or to be displayed directly following their reception, said method comprising an interfacing step with the display intended to respect, among other things, the display time of said packets, characterized in that said method comprises a step for reformatting said packets intended to be displayed after recording in such a manner that these packets after they have been read are received by the interface module with the display in the same format as said packets intended to be displayed directly following their reception, And during the reformatting step of said packets, at least one time stamp of the packets intended for the recording is modified.

BRIEF DESCRIPTION OF THE DRAWINGS

The invention will be better understood and illustrated by means of embodiments and implementations, by no means limiting, with reference to the annexed figures, wherein.

DETAILED DESCRIPTION OF THE PREFERRED EMBODIMENTS

The modules shown are functional units that may or may not correspond to physically distinguishable units. For example, these modules or some of them can be grouped together in a single component, or constitute functions of the same software. On the contrary, some modules may be composed of separate physical entities.

Figure 1:
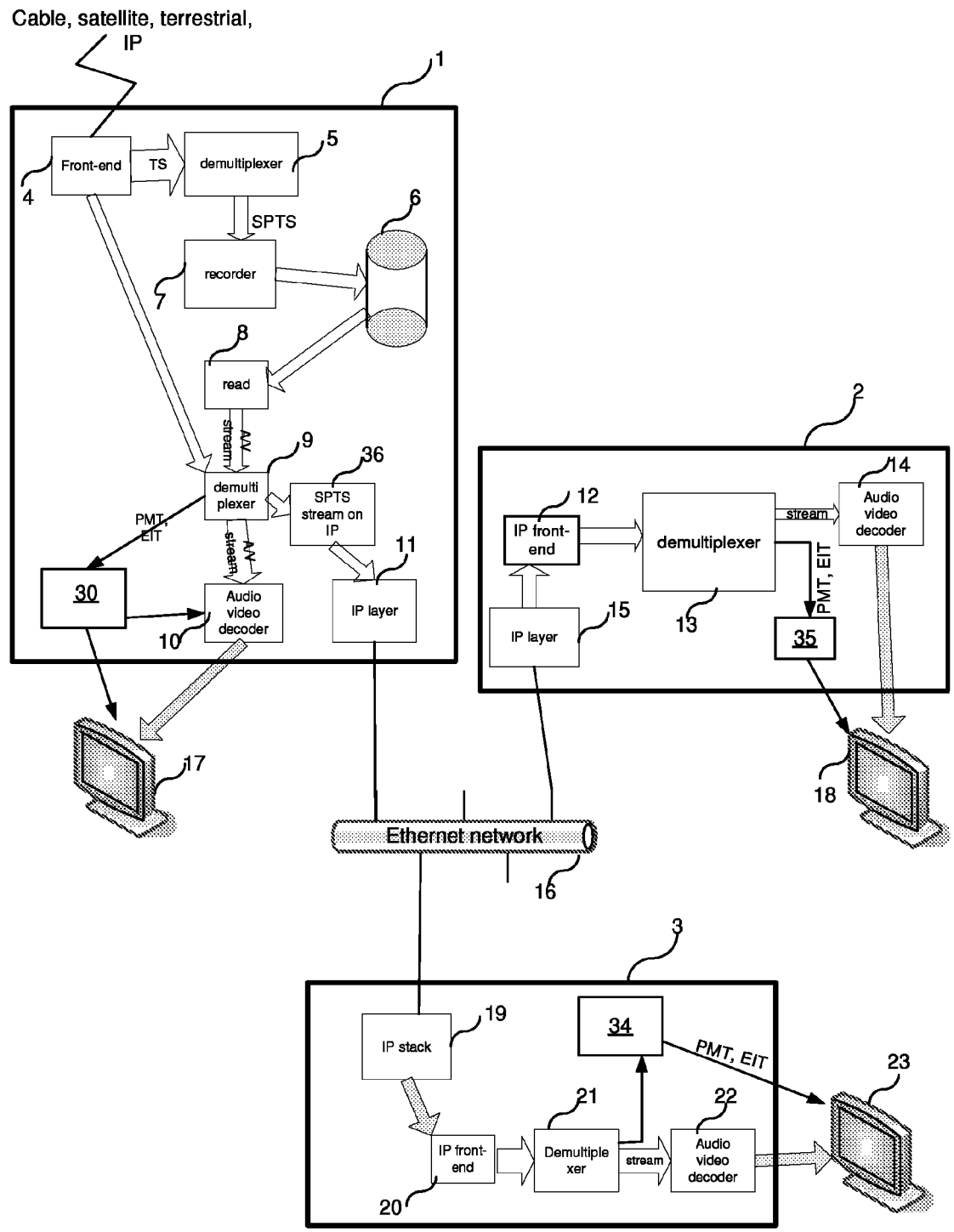
FIG. 1 shows a system comprising a device according to a preferred embodiment of the invention.

FIG. 1 shows a system comprising a data reception device 1 according to a preferred embodiment of the invention.

This device comprises a circuit 4 being able to interface with an outside broadcast network. This circuit 4 is different according to whether the exterior network is of the cable, satellite, terrestrial or IP (internet protocol) type. This circuit 4 receives the data and transmits it to a demultiplexer 5. The data received is data encoded according to the MPEG-2 of DVB format. A DVB or MPEG-2 stream comprises several layers and particularly the transport or TS (transport stream) layer. The data at the output of the circuit 4 is then encapsulated in a data stream of the transport type (TS) generally containing several multiplexed digital services as well as the associated service information according to the DVB/MPEG standards. The demultiplexer 5 demultiplexes the incoming stream comprising several programmes, the format of the data being of the MPTS type (Multiple Program Transport Stream) and produces data streams in the SPTS form (Single Program Transport Stream). The demultiplexer 5 also extracts the service information relating to the required service from the stream, such as the list of the PIDs, packet identifiers, elementary streams constituting it.

The demultiplexed data stream is analysed by a recording module 7.

This recording module modifies the different streams received notably some information contained in the event tables, hereafter referred to as EIT (Event Information Table) and defined in the DVB standard. These information tables indeed comprise information relating to the streams. In the DVB standard, a p/f EIT (present/following) relating to a service contains the description of the present broadcast event as well as the following event. This description is mainly constituted by the name of the event, its start time, its duration as well as a summary.

These tables are sent in the multiplexed stream with the audio and the video in the MPEG sections encapsulated in TS packets in the same manner as the other signalling tables. The frequency of repetition of this table is at least two seconds.

Such an event table is shown below in the table 1.

TABLE 1

EIT table as defined in the DVB standard.

```
Event_information_section( ){
table_id
section_syntax_indicator
reserved_future_use
reserved
section_length
service_id
reserved
version_number
current_next_indicator
section_number
last_section_number
transport_stream_id
original_network_id
segment_last_section_number
last_table_id
for(i=0;i<N;i++){
```

TABLE 1-continued

EIT table as defined in the DVB standard.

```
    event_id
    start_time
    duration
    running_status
    free_CA_mode
    descriptors_loop_length
    for(i=0;i<N;i++){
        descriptor( )
    }
}
CRC_32
}
```

The "start-time" field shows the time stamp that enables a display device to know the programme start time and therefore to display this program at the scheduled time.

The "duration" field shows the programme duration.

When the data stream is recorded and not directly displayed, the "start time" field loses its meaning. The absolute display time is no longer the time sent by the programme broadcaster in the table of the EITs but will be the time chosen by the user of the reception device 1.

The recording device 7 then modifies the "start-time" field by replacing the time given by the broadcaster by, for example, a recording time. It can also replace it by a null value. One advantage of replacing the start time by the recording time can subsequently enable this item of recording time data to be recovered for other functionalities of the PVR and for example to enable the user to know when he recorded this programme or to classify the films in order of recording.

The recording device can also leave the time as it is shown and it will only be modified when the packets are read in the recording means 6.

The data packets of the stream as well as the EITs are recorded in a storage means 6. Preferentially, this storage means is a hard disk (HDD). In other embodiments, this storage means can be a holographic type support, a memory card of the flash memory type or any other optical or magnetic support.

When the user decides to view the data recorded on the recording support 6, the reading module 8 reads them in the recording support. During the reading, it thus replaces the recording time in the table of the EITs by the actual display time. Hence, it reconstructs a stream for a demultiplexing module 9 having the same format as the data stream received directly. The demultiplexer 9 then receives the streams coming from the live and the flows having previously recorded, the two flows being transmitted according to the same format.

Hence, the packets received each comprising an absolute time stamp, preferentially contained in the EITs, and showing the display time of said packets, said packets being intended to be displayed after their recording, or to be displayed directly following their reception, the device comprises an interface module (30) with the display intended to respect, among other things, the display time of said packets.

Hence, in a preferential manner, the means (5, 7, 8, 9) for reformatting said packets intended for the recording replaces the time stamp of the packets received by a new recording time stamp prior to their recording and while they are read with a view to display, replacing the recording time stamp with a time stamp representing the display time of said packets.

The demultiplexer 9 sends, on the one hand, the audio video data to an audio video decoder 10, shown as a single decoder in FIG. 1 but being in reality composed of an audio decoder and a video decoder.

On the other hand, it sends the information necessary for a display device 17, which is the information of the EITs and PMT (Program Map Table), to a module 30. This module 30 manages the graphic interface on the screen and enables data related to the current programme to be displayed. Thanks to the invention, this module is unique, whether the data has been previously recorded or whether it comes directly from the broadcaster. This advantageously enables the device 1 to be simplified, both in terms of development costs and in terms of development. This module 30 then receives instructions from the user of the display device 17, by means of a graphic interface, from a remote control. Among these instructions, one particularly finds commands for playing in fast rewind, fast forward, pause, deferred play, etc. It also sends commands to the display device 17.

The device therefore comprises
  means (5, 7, 8, 9) for reformatting said packets intended to be displayed after recording in such a manner that these packets after they have been read are received by the interface module with the display (30) in the same format as the packets intended to be displayed directly following their reception,
  the means (5, 7, 8, 9) for reformatting the packets modifies at least the time stamp of the packets intended for the recording.

When the data is sent to one or more remote devices, shown in FIG. 1 by the modules 2 and 3 and connected to each other by means of an internet network, the data is sent to a module 36 that constructs the transport packets intended for the internet network, the packets thus constructed are then sent to a module 11 that sends them over the network.

In other embodiments, domestic networks of other types can be considered and for example compliant with the IEEE-1394 protocol.

The device 2 (respectively 3) comprises a domestic network interface 15 (respectively 19 in the device 3) intended to receive and filter the packets that are intended for it, this interfaces are identical to the module 11.

Figure 2:
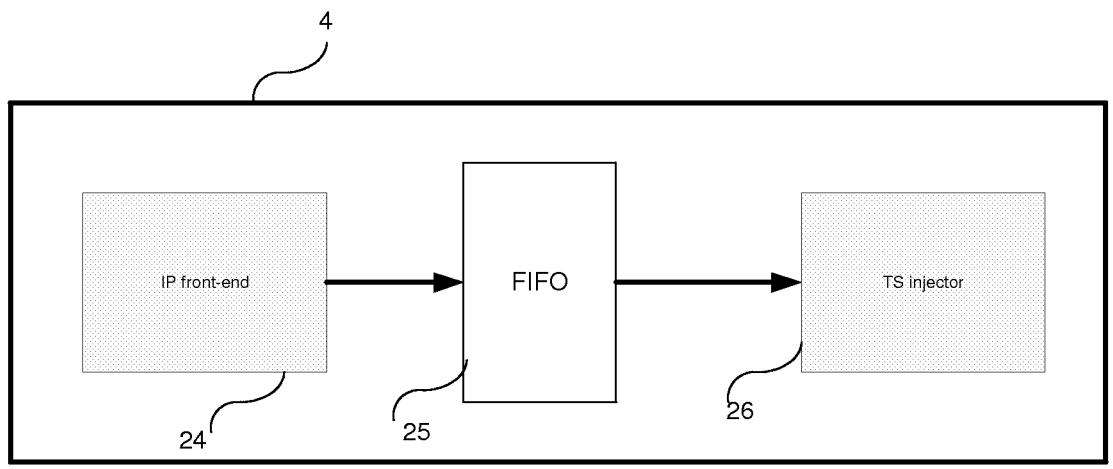
FIG. 2 shows an IP front-end.

The data is then sent to a module 12 (respectively 20 in the device 3) of the IP front-end type as shown in FIG. 2. The data is then sent to a demultiplexer 13 (respectively 21 in the device 3) identical to the demultiplexer 9. The data is then sent to an audio video decoder 15 (respectively 22 in the device 3), in reality two decoders, one to decode the audio and the other to decode the video. The EIT and PMT type data is sent to a module 35 (respectively 36 in the device 3) identical to the module 30. The data is then sent to a display device 18 (respectively 23 for the device 3) to be displayed in accordance with the data sent in the EIT and PMT.

The path followed by the data in the modules 2 and 3 is similar to the path followed by the data in the device 1 during a direct viewing.

When the data is read according to a special reproduction mode, whether this is in the device 1, 2 or 3 for example fast forward, fast rewind, etc. the time of duration of the programme is modified in the EITs. The modules 30, 34 and 35, according to the module that requests this function, will modify the "duration" field in the EITs. In this manner, on the screen, the real value is correctly displayed. The invention thus makes possible the update of the EIT event tables in a rapid manner, according to the special modes, which enables consistent information always to be obtained. This is made possible thanks to the fact that the module 30 transparently manages the origin of the stream, whether it comes from the storage means or directly from the broadcaster.

FIG. 2 shows the module 4 when it relates to a broadcast of data according to the IP protocol. This front-end thus comprises an IP type front-end 24, whose output is connected to a memory 25 of the FIFO type. This FIFO memory is connected to a module 26 that enables the transport type stream to be injected towards the demultiplexer 5. The FIFO memory is used to buffer the stream arriving from the IP front-end and therefore to absorb the jitter.

Figure 3:
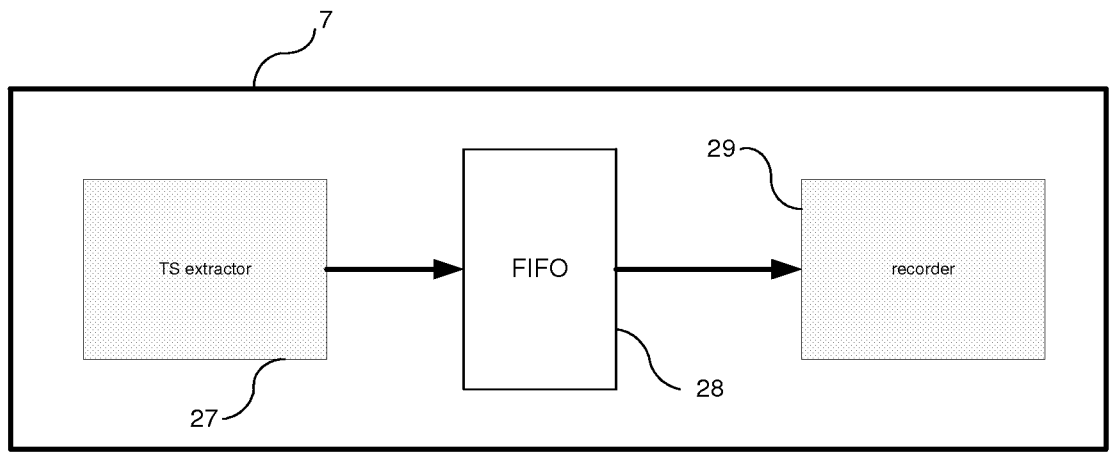
FIG. 3 shows a recording module.

FIG. 3 shows the recording module 7. This module comprises a transport packet extractor 27, which selects the packets corresponding to the stream that is required to be recorded and extracts the PMT and EIT tables by eliminating the data relating to the non-recorded packets. The module 27 also modifies the "start time" field prior to the recording according to a preferred embodiment as previously specified.

This module 27 is connected to a memory 28 of the FIFO type. This memory 28 is connected at the output to a module 29 responsible for controlling the write operation to the storage means 6.

Figure 4:
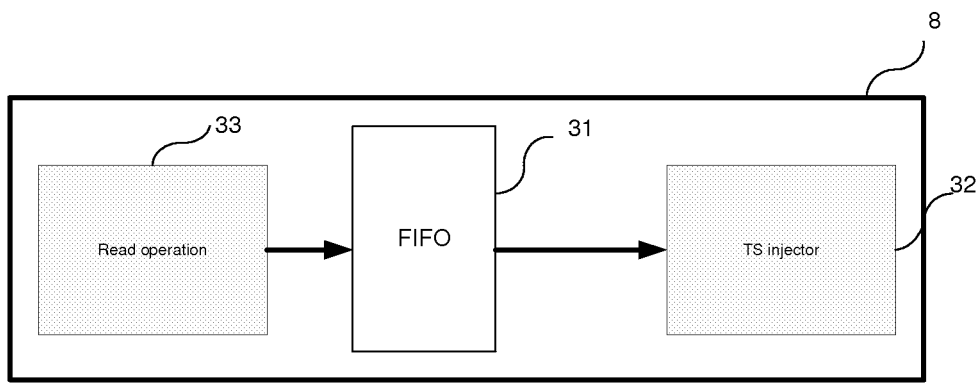
FIG. 4 shows a reading module.

FIG. 4 shows the reading module 8. This module comprises a module 33 intended to read from the storage means 6. It then sends the data to a memory 31 of the FIFO type. At the output of the FIFO, the data is sent to a module 32 that injects the transport data stream toward the demultiplexer 9. It is the module 32 that modifies the table of the EITs to replace, in the "start_time" field, the time inserted during the recording by the time of viewing.

In other embodiments, the recording means 6 can be remote.

In other embodiments, the transmission of the data is not in accordance with the DVB format but the data packets comprise time stamps that are carried not in EITs but in other types of messages.

The invention claimed is:

1. A device for receiving audio video data packets, each of said packets received having an absolute time stamp representing the display time of said packets, said packets being intended to be displayed after their recording, or to be displayed directly following their reception, said device further including an interface module with the display intended to respect, among other things, the display time of said packets, wherein the device comprises:
  a formatting module attached to a storage device and configured to reformat said packets intended to be displayed after recording in such a manner that these packets after they have been read are received by the interface module with the display in the same format as said packets intended to be displayed directly following their reception,
  said formatting module being further configured to reformat said packets by modifying at least the time stamp of the packets intended for the recording.

2. The device according to claim 1, wherein the formatting module for reformatting said packets intended for the recording replaces the time stamp of the packets received by a new recording time stamp prior to their recording and while they are read with a view to display, replacing the recording time stamp with a time stamp representing the display time of said packets.

3. The device according to claim 1, wherein the interface module with the display is responsible for transmitting commands to a display device and for receiving instructions from a user, said interface module being suitable to modify the event tables of the audio video packets intended for viewing or previously recorded.

4. The device according to claim 3, wherein when the user wants to display the flow according to a special mode, said interface means modify a field relating to the duration in said event tables according to said special mode.

5. The device according to claim 1, wherein said video data packets comprise service information in accordance with the DVB standard.

6. The device according to claim 1, wherein the formatting module for reformatting said packets intended to be displayed after recording comprises:
- first demultiplexing submeans of the received packets to select the packets intended for the recording,
- recording of said packets selected and of time stamps on a storage means,
- reading of said packets and said time stamps,
- first modification of said time stamps,
- second demultiplexing of said packets in such a manner as to separate said packets and the time stamps,
- decoding submeans of said audio and video packets.

7. The device according to claim 6, which comprises between the first demultiplexing and the recording, second modification of the time stamps.

8. The device according to claim 6, further comprising a connection module configured to connect the device to a local network intended to transmit packets to remote viewing devices.

9. The device according to claim 1, wherein said service information is inserted periodically into the data packets during their reading after their recording.

10. A method for receiving video data packets, each of said packets received comprising an absolute time stamp representing the display time of said packets, said packets being intended to be displayed after their recording, or to be displayed directly following their reception, said method comprising an interfacing step with the display intended to respect, among other things, the display time of said packets, wherein said method comprises the steps of:
- reformatting said packets intended to be displayed after recording such that these packets after they have been read are received by the interface module with the display in the same format as said packets intended to be displayed directly following their reception, and
- during the reformatting of said packets, modifying at least one time stamp of the packets intended for the recording.

* * * * *